United States Patent [19]

Cygan et al.

[11] Patent Number: 5,564,086
[45] Date of Patent: Oct. 8, 1996

[54] METHOD AND APPARATUS FOR ENHANCING AN OPERATING CHARACTERISTIC OF A RADIO TRANSMITTER

[75] Inventors: Lawrence F. Cygan, Schaumburg; Paul H. Gailus, Prospect Heights; William J. Turney, Schaumburg; Francis R. Yester, Jr., Arlington Heights, all of Ill.

[73] Assignee: Motorola, Inc., Schaumburg, Ill.

[21] Appl. No.: 158,551

[22] Filed: Nov. 29, 1993

[51] Int. Cl.⁶ .................................................. H04B 1/04
[52] U.S. Cl. ..................... 455/126; 455/155; 455/123; 455/129; 343/861
[58] Field of Search ...................... 455/126, 107, 455/115, 120, 121, 122, 123, 124, 127, 129, 125; 330/107; 370/94.1; 343/860, 861; 324/646, 602

[56] References Cited

U.S. PATENT DOCUMENTS

| | | | |
|---|---|---|---|
| 4,246,535 | 1/1981 | Huang et al. | 324/57 |
| 4,493,112 | 1/1985 | Bruene | 455/115 X |
| 4,704,573 | 11/1987 | Turner, Jr. | 324/58 |
| 4,985,686 | 1/1991 | Davidson et al. | 455/123 X |
| 5,066,923 | 11/1991 | Gailus et al. | 330/107 |

Primary Examiner—Reinhard J. Eisenzopf
Assistant Examiner—Philip J. Sobutka
Attorney, Agent, or Firm—Daniel C. Crilly; James A. Coffing

[57] ABSTRACT

In a radio transmitter (100) that includes a power amplifier (104) and an antenna (106), a method for enhancing an operating characteristic of the radio transmitter (100) can be accomplished in the following manner. The power amplifier (104) provides a signal (113) to a variable matching network (111), wherein the signal (113) comprises energy to be radiated by the antenna (106). The variable matching network (111) couples the signal (113) to a sampler (112) that is operably coupled to an output of the variable matching network (111) and the antenna (106). The sampler (112) samples a forward component (114) and a reflected component (115) of the signal (113). The radio transmitter (100) processes the sampled forward and reflected components (116, 118) to produce a feedback control signal (120). The feedback control signal (120) is used to adjust the variable matching network (111), such that an operating characteristic of the radio transmitter (100) is enhanced.

15 Claims, 1 Drawing Sheet

METHOD AND APPARATUS FOR ENHANCING AN OPERATING CHARACTERISTIC OF A RADIO TRANSMITTER

FIELD OF THE INVENTION

The present invention relates generally to radio frequency transmitters and, in particular, to a linear radio frequency transmitter having a varying antenna load.

BACKGROUND OF THE INVENTION

As is known, radio frequency (RF) transmitters modulate baseband signals, such as analog voice or digital voice samples, onto an RF carrier, amplify the RF carder, and transmit the RF carrier, via an antenna, through the air as electromagnetic energy. The electromagnetic energy is subsequently received by a receiver's antenna, demodulated back to the baseband signal, and reconstructed into its original form by the receiver.

As is also known, many communication systems, such as cellular telephone and thinking systems, utilize spectrally efficient modulation techniques, such as quadrature amplitude modulation (QAM) and quaternary phase shift keying (QPSK), in a time division multiple access (TDMA) format. These spectrally efficient modulation techniques typically correlate the baseband signal to changes in RF carder amplitude and phase via a digital symbol constellation format. Since the spectrally efficient modulation techniques require variation of the RF carder amplitude, a linear class A or class AB amplifier must be used. If the amplifier is non-linear, it provides unwanted RF energy, or splatter, at frequencies adjacent to the RF carder. This splatter may subsequently interfere with two-way communications in process on the adjacent frequencies, or channels.

Linearity of a power amplifier is affected by the varying load impedances presented by the radio transmitter's antenna. Typically, an antenna is designed to provide a fixed load impedance, 50 ohms for example. However, due to the proximity of the antenna to highly reflective objects, such as automobiles or metal walls, the antenna impedance changes.

To minimize variations in power amplifier loading, transmitters generally incorporate isolators to provide a substantially constant load impedance to the amplifier. The isolator includes a circulator and a terminating impedance, which is typically 50 ohms. The circulator is a three-terminal device that provides unidirectional flow of the RF energy—i.e., from the amplifier to the antenna, and from the antenna to the terminating impedance. Therefore, the RF energy sourced by the amplifier is provided to the antenna and any RF energy reflected by the antenna is absorbed in the terminating impedance. In this manner, the isolator presents a constant impedance to the RF power amplifier irrespective of the antenna load impedance.

Although the isolator provides a constant load impedance, other factors—e.g., size, cost, and bandwidth limitations—typically inhibit the use of a universal isolator in mobile radios, portable radios, and cellular telephones. For example, a radio that operates at 132 MHz requires an isolator that has a volume of 8.19 cubic centimeters (0.5 cubic inches), weighs 227 grams (0.5 pounds), and costs at least $30/unit. As a result, an isolator puts undesired size, weight, and cost constraints on the design of such radios. Additionally, isolators have fixed bandwidths; therefore, multiple isolators may be required in transmitters that operate over a wide frequency range. This bandwidth limitation is most noticeable at lower RF carrier frequencies, such as VHF, where the allocated frequency band covers a large percentage bandwidth. Further, the isolator dissipates a considerable amount of RF energy when the antenna presents a highly reflective load impedance. This energy dissipation negatively impacts the net gain and efficiency of the radio transmitter.

To avoid the use of the isolator, existing frequency modulation (FM) transmitters, which employ nonlinear amplifiers, typically utilize protective feedback circuitry. The protective feedback circuitry monitors the voltage standing wave ratio (VSWR) at the nonlinear amplifier's output, and correspondingly reduces the mount of output power provided by the nonlinear amplifier to the antenna. This approach typically reduces the nonlinear amplifiers output power by a fixed mount when the VSWR exceeds a predetermined level. For example, when a 3:1 VSWR is detected at the nonlinear amplifier's output, the output power may be reduced by 3 dB. Although this approach works for nonlinear amplifiers, it does not include any provisions for maintaining amplifier linearity under high VSWR load conditions. Thus, this simple power reduction approach is not readily applicable for use in a linear amplifier.

Alternatively, a known method for detecting and correcting impedance mismatches may be used to obviate the use of an isolator in an FM transmitter. This method—as described in U.S. Pat. No. 4,704,573, entitled "Impedance Mismatch Detector" and assigned to Motorola, Inc.—allows impedance mismatches between the amplifier and the antenna to be measured and adaptively corrected during changes in operating conditions of the amplifier. Although this method provides a technique for electronically correcting poor loads presented to an amplifier, it is not readily adaptable for use in a linear transmitter since it does not provide means for changing the amplifier's load without influencing important linear performance parameters, such as adjacent channel splatter.

Therefore, a need exists for a method to enhance operating characteristics of a linear transmitter that operates under varying antenna loads without having to use an isolator.

DESCRIPTION OF A PREFERRED EMBODIMENT

Generally, the present invention provides a method and apparatus for enhancing an operating characteristic of a radio transmitter. A power amplifier provides a signal to a variable matching network, wherein the signal comprises energy to be radiated by an antenna. The variable matching network couples the signal to a sampler that is operably coupled to an output of the variable matching network. The sampler samples forward and reflected components of the signal and provides these samples to a processor. The processor then processes the sampled forward and reflected components to produce a feedback control signal. The feedback control signal is used to adjust the variable matching network, such that an operating characteristic of the radio transmitter is enhanced. By providing the transmitter operating characteristic enhancement in this manner, the power amplifier maintains acceptable performance, despite varying antenna loads, without requiring an isolator between the amplifier output and the antenna, as in prior art transmitters.

Figure 1:
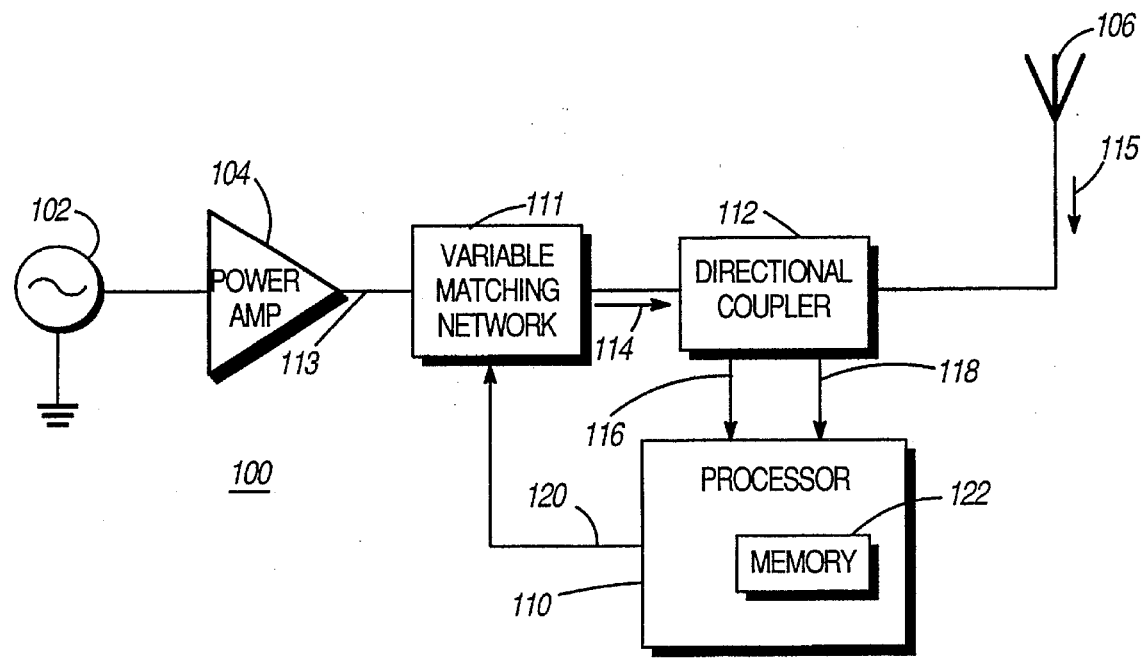
FIG. 1 illustrates a radio transmitter, in accordance with the present invention.

The present invention can be more fully described with reference to FIGS. 1 and 2. FIG. 1 illustrates a radio transmitter 100 that includes a signal source 102, a power amplifier 104, an antenna 106, a processor 110, a variable matching network 111, and a directional coupler 112, in accordance with the present invention. The variable matching network 111 preferably comprises voltage variable capacitors (e.g., varactor diodes) and other discrete, or distributed, reactive elements—such as inductors, capacitors, and/or transmission lines. The directional coupler 112 is well known, and typically comprises a pair of coupled transmission lines, or a coupled inductor/capacitor topology that can determine the directional flow of a radio frequency (RF) signal.

In a preferred embodiment, the signal source 102 comprises a digital signal processor (DSP) and circuitry necessary to upconvert the digital baseband output of the DSP to an RF signal. However, in alternate transmitters, the signal source 102 may comprise a variety of known modulators, such as an amplitude modulator or a frequency modulator, and their associated upconverting circuitry. In the preferred embodiment, the power amplifier 104 comprises a linear class A RF power amplifier, but other amplifier topologies may also be employed, such as linear class AB or nonlinear class C. The processor 110 includes a memory 122, such as a read only memory (ROM), and may comprise a DSP, a microprocessor, or any combination thereof that provides means for processing its input signals.

General operation of the radio transmitter 100 occurs in the following manner. The signal source 102 provides an input energy signal to the power amplifier 104. The input energy signal preferably comprises a plurality of time division multiple access (TDMA) time frames, as described below. However, the input signal may also comprise any modulated signal used for radio communications.

The power amplifier 104 amplifies the input energy signal and provides an amplified signal 113 at its output. The amplified signal 113 is applied to the variable matching network 111, which transforms the load impedance presented to the power amplifier 104, without introducing significant signal attenuation. The amplified signal 113 exits the variable matching network's output and proceeds through the directional coupler 112 to the antenna 106 where it is radiated as electromagnetic energy.

The degree to which the amplified signal 113 is radiated from the antenna 106 is dependent upon the impedance of the antenna 106. The antenna 106 is generally designed to provide a predetermined nominal input impedance (e.g., 50 ohms) when the antenna 106 is located in an environment that approximates free space. However, the antenna's input impedance is greatly affected by the physical environment in which it is located. In a practical environment, the antenna impedance deviates from its design value due to the presence of reflective structures positioned in close proximity to the antenna 106. For example, portable radio antennas are often used near metal buildings and walls in urban environments. The result of using the antenna 106 near reflective objects is a significant variation in the antenna's input impedance. Thus, when operated near reflective structures, the antenna 106 radiates only a portion of the amplified signal 113. The portion that is not radiated re-enters the antenna 106 as reflected energy 115.

The directional coupler 112 provides a means of sampling forward 114 and reflected 115 components of the amplified signal 113 without significantly attenuating the amplitude of the amplified signal 113. The directional coupler 112 extracts a small portion (typically less than 10%) of the forward and reflected components 114, 115 to produce a sampled forward component 116 and a reflected component 118, respectively. The exact portion extracted is chosen to provide samples 116, 118 having signal-to-noise ratios suitable for further processing. Typically, the directional coupler 112 utilizes substantially identical scaling factors to sample both the forward and reflected components 114, 115; however, non-identical sampling may also be performed.

In a preferred embodiment, the directional coupler 112 provides its samples 116, 118 in sinusoidal form to the processor 110 for further processing. The processor 110 transforms the samples 116, 118 to a digital format using an analog-to-digital (A/D) conversion technique, and then computes a ratio of the reflected sample 118 to the forward sample 116. Since the samples 116, 118 are sinusoidal, the computed ratio contains both a magnitude component and a phase component. This vector quantity-well known in the art as the reflection coefficient-provides a direct correspondence to the power amplifier load impedance presented by the antenna 106. Once computed, the reflection coefficient may also be used in a known manner to calculate the particular impedance presented to the antenna 106. Since both the reflection coefficient and the antenna's input impedance uniquely correspond to the load condition present at the antenna 106, the processor 110 may use either quantity to generate a feedback control signal 120. For the remainder of this discussion, it is assumed that the processor 110 computes the reflection coefficient.

After computing the reflection coefficient, the processor 110 compares the reflection coefficient to data contained in its memory 122. The data—i.e., a so-called 1ook-up table of various reflection coefficients and corresponding feedback control signals 120—is preferably entered into memory 122 when the radio transmitter 100 is manufactured. In this manner, the processor 110 retrieves the feedback control signal 120 that corresponds to the computed reflection coefficient and applies it to the variable matching network 111. The feedback control signal 120 is preferably a DC voltage that is subsequently applied to a varactor diode in the variable matching network 111. However, the feedback control signal 120 may be either an analog or digital waveform, depending on the construction of the variable matching network 111.

In an alternate embodiment, the look-up table may be replaced by a mathematical system of equations that uses the reflection coefficient, or the antenna impedance, to provide the feedback control signal 120 directly, without the need for extensive data storage. It should also be noted that, although a preferred embodiment of the present invention utilizes the directional coupler 112 to provide forward and reflected component samples 116–118, alternate quantities may be sampled by the radio transmitter 100. For example, measurement of the DC current drawn by the power amplifier 104 may be substituted for the reflected sample 118 in some applications. In this case, the feedback control signal 120 is generated based on the measured DC current.

As briefly mentioned above, the feedback control signal 120 is applied to the variable matching network 111 to adjust the impedance transformation provided by the variable matching network 111 in response to changes in the loading condition of the antenna 106. The variable matching network 111 receives the feedback control signal 120 via a wire, a printed circuit board trace, or any other equivalent means for providing an analog or digital control signal. In this way, the variable matching network 111 dynamically corrects the mismatch between the output impedance of the power amplifier 104 and the input impedance of the directional coupler 112 caused by changes in the antenna load impedance. By correcting this impedance mismatch, the present invention enhances an operating characteristic of the radio transmitter 100—such as power amplifier linearity, energy transfer between the power amplifier 104 and the antenna 106, or power amplifier gain—in the presence of varying antenna loads.

One particularly significant aspect of the present invention lies in the structural composition and orientation of the variable matching network 111 and the directional coupler 112. As depicted in FIG. 1, the variable matching network 111 precedes the directional coupler 112, or sampler. This configuration enables the variable matching network 111, via the feedback control signal 120, to present a constant load impedance, or desired load mismatch, to the power amplifier 104 during variation of antenna loading, while preserving the information of the amplified signal samples 116, 118. The ability of the present invention to create a particular load at the power amplifier's output allows the radio transmitter 100 to maintain, or improve, key performance characteristics, such as gain, linearity, and efficiency, to attain a predetermined operating condition (e.g., enhanced linearity or gain) or to operate under varying antenna loads. By contrast, prior art methodologies transpose the order of the variable matching network 111 and the directional coupler 112. This approach allows a constant load impedance to be presented to the power amplifier 104 during changes in antenna loading, but does not facilitate computation of an antenna load reflection coefficient due to the reflected sample's dependence on the response of the variable matching network 111. Thus, the present invention, unlike the prior art, is capable of adaptively generating desired power amplifier loads via its variable matching network 111 and, accordingly, may be utilized to enhance key transmitter performance characteristics in response to changes in antenna loading.

Figure 2:
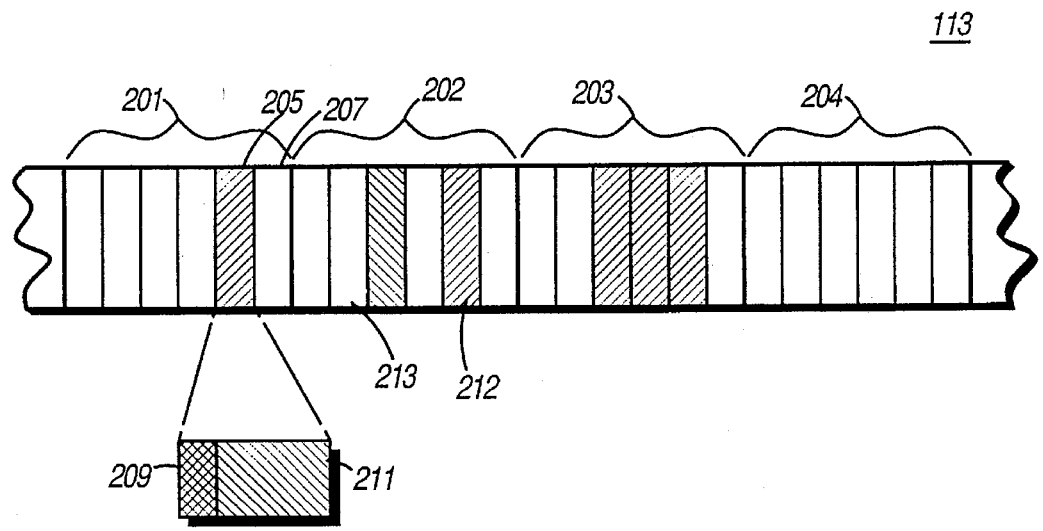
FIG. 2 illustrates a preferred data stream comprising time division multiple access (TDMA) time frames, in accordance with the present invention.

FIG. 2 illustrates a preferred data stream comprising TDMA time frames 201–204, each frame including six time slots, in accordance with the present invention. The time slots may be information bearing time slots (e.g., 205, 212), or non-information bearing time slots (e.g., 207, 213). Depending on radio communication system configuration, a variety of information bearing and non-information bearing time slot combinations may be utilized to transmit information. For example, a time frame 201 may include a single information bearing time slot 205 and a plurality of non-information bearing time slots 207. Alternatively, time frames 202–203 may include multiple information bearing and non-information bearing time slots. Further, another time frame 204 may comprise only non-information bearing time slots—e.g., silence.

The information bearing time slot 205 is partitioned into a training portion 209 and an information portion 211. Sampling of the forward and reflected components 114–115 of the amplified signal 113, as earlier described, is preferably performed during the training portion 209. In a linear transmitter of the type detailed in U.S. Pat. No. 5,066,923, entitled "Linear Transmitter Training Method And Apparatus," and assigned to Motorola, the training portion 209 is used to dynamically adjust transmitter operating parameters that affect linearity prior to transmission of the information portion 211. Thus, by sampling the amplified signal 113 during the training portion 209, the present invention avoids using time allocated for transmitting the information portion 211 to perform the sampling, thereby preserving data transmission efficiency. It should be noted that sampling during the information portion 211 is possible, though not desirable, since its random nature may require lengthy time averaging of the samples 116, 118, thus producing significant computational delays in the processor 110.

Once the sampled forward and reflected components 116, 118 are obtained, the radio transmitter 100 preferably uses the non-information bearing time slots 207, 213 to process the sampled components 116, 118, generate the feedback control signal 120, and adjust the tunable elements of the variable matching network 111. During the non-information bearing time slots 207, 213, the signal processing facilities (e.g., 110) of the radio transmitter 100 are utilized less than during information bearing time slots 205, 212. Thus, by using the time corresponding to non-information bearing time slots 207, 213 to process the sampled components 116, 118, generate the feedback control signal 120, and adjust the variable matching network 111, the present invention effectively equalizes the processing load of the processor 110, thereby reducing processor hardware and current drain requirements. Further, by performing the aforementioned functions during the non-information bearing time slots 207, 213, the present invention obviates generating adjacent channel splatter that may be produced by adjusting the variable matching network 111 during the information bearing time slots 205, 212.

The present invention provides a method and apparatus for enhancing an operating characteristic of a radio transmitter. With this invention, transmitter performance may be dynamically optimized and maintained without utilization of an isolator between the power amplifier and the antenna. Further, the present invention allows rapid adjustment of the power amplifier's output matching network in response to varying antenna loads without generating adjacent channel interference, a feature that is unavailable using prior art matching network adjustment techniques.

We claim:

1. In a radio transmitter that includes a power amplifier and an antenna, a method for enhancing an operating characteristic of the radio transmitter in an environment of varying antenna loads, the method comprising the steps of:

A) providing a signal, by the power amplifier, wherein the signal comprises energy to be radiated by the antenna;

B) coupling, by a variable output matching network of the power amplifier, the signal to a sampler that is operably coupled to an output of the variable output matching network and the antenna;

C) sampling, by the sampler, a forward component of the signal to produce a sampled forward component;

D) sampling, by the sampler, a reflected component of the signal to produce a sampled reflected component;

E) processing the sampled forward component and the sampled reflected component to produce a feedback control signal; and F) using the feedback control signal to adjust the variable output matching network of the power amplifier to compensate for the varying antenna loads.

2. The method of claim 1, wherein step (A) comprises the step of providing a plurality of time division multiple access (TDMA) time frames, each of the plurality of TDMA time frames including a plurality of information bearing time slots.

3. The method of claim 2, wherein step (A) further comprises the step of partitioning at least one of the plurality of information bearing time slots into a training portion and an information portion to produce at least one partitioned information bearing time slot.

4. The method of claim 3, wherein step (C) comprises the step of sampling a forward component of the at least one partitioned information beating time slot at a time substantially within the training portion to produce the sampled forward component.

5. The method of claim 3, wherein step (D) comprises the step of sampling a reflected component of the at least one partitioned information bearing time slot at a time substantially within the training portion to produce the sampled reflected component.

6. The method of claim 2, wherein step (A) further comprises the step of providing the plurality of TDMA time frames, each of the TDMA time frames including a plurality of non-information bearing time slots.

7. The method of claim 6, wherein step (F) comprises the step of conveying the feedback control signal to the variable matching network at a time corresponding to at least one of the plurality of non-information bearing time slots.

8. The method of claim 10, wherein step (D) comprises the step of sampling the reflected component of the at least one partitioned information beating time slot at a time substantially within the training portion to produce the sampled reflected component.

9. The method of claim 7, wherein step (D) comprises the step of sampling the reflected component of the at least one partitioned information bearing time slot at a time substantially within the training portion to produce the sampled reflected component.

10. The method of claim 7, wherein step (C) comprises the step of sampling the forward component of the at least one partitioned information beating time slot at a time substantially within the training portion to produce the sampled forward component.

11. A radio transmitter that includes a power amplifier and an antenna for radiating an information bearing signal, the, radio transmitter operating in an environment of varying antenna loads, the radio transmitter comprising:

a variable output matching network of the power amplifier;

sampling means, operably coupled to an output of the variable output matching network and the antenna, for sampling a forward component of the information bearing signal to produce a sampled forward component and a reflected component of the information bearing signal to produce a sampled reflected component;

signal processing means, operably coupled to the sampling means, for processing the sampled forward component and the sampled reflected component to produce a control signal; and feedback means, disposed between the signal processing means and the variable output matching network, for coupling the control signal to the variable output matching network to compensate for the varying antenna loads.

12. The radio transmitter of claim 11, Wherein the sampling means comprises a directional coupler.

13. The radio transmitter of claim 11, wherein the variable matching network comprises at least one varactor diode and at least one transmission line.

14. The radio transmitter of claim 11, wherein the signal processing means comprises a read-only memory.

15. In a radio transmitter that includes a power amplifier and an antenna, a method for enhancing an operating characteristic of the radio transmitter in an environment of varying antenna loads, the method comprising the steps of:

A) providing a plurality of time division multiple access (TDMA) time frames, each of the plurality of TDMA time frames including a plurality of information bearing time slots and a plurality of non-information bearing time slots, at least one of the plurality of information bearing time slots being partitioned into a training portion and an information portion to produce at least one partitioned information bearing time slot, wherein the plurality of information bearing time slots comprise energy to be radiated by the antenna;

B) coupling, by a variable output matching network of the power amplifier, the plurality of TDMA time frames to a sampler that is operably coupled to an output of the variable output matching network and the antenna;

C) sampling, by the sampler, a forward component of the at least one partitioned information bearing time slot at a time substantially within the training portion to produce a sampled forward component;

D) sampling, by the sampler, a reflected component of the at least one partitioned information bearing time slot at a time substantially within the training portion to produce a sampled reflected component;

E) processing the sampled forward component and the sampled reflected component to produce a feedback control signal; and F) conveying the feedback control signal to the variable output matching network at a time corresponding to the plurality of non-information bearing time slots to adjust the variable output matching network to compensate for the varying antenna loads.

\* \* \* \* \*